(12) United States Patent
Baker et al.

(10) Patent No.: US 7,381,251 B2
(45) Date of Patent: Jun. 3, 2008

(54) MINERAL PARTICLE DISPERSIONS STABILIZED WITH A POLY (OXYALKENE) PHOSPHONATE

(75) Inventors: John Marshall Baker, Glen Allen, VA (US); Mikel Morvan, Princeton, NJ (US); Amit Sehgal, Burlington, NJ (US); Shiming Wo, Monroe Township, NJ (US)

(73) Assignee: Rhodia Inc., Cranbury, NJ (US)

( * ) Notice: Subject to any disclaimer, the term of this patent is extended or adjusted under 35 U.S.C. 154(b) by 23 days.

(21) Appl. No.: 11/393,414

(22) Filed: Mar. 30, 2006

(65) Prior Publication Data

US 2006/0241008 A1    Oct. 26, 2006

Related U.S. Application Data

(60) Provisional application No. 60/667,176, filed on Mar. 31, 2005.

(51) Int. Cl.
*B01F 17/14* (2006.01)
*B01F 17/42* (2006.01)
*C09D 1/00* (2006.01)
*C09D 4/00* (2006.01)
*C09D 7/12* (2006.01)

(52) U.S. Cl. .............. 106/14.12; 106/14.15; 106/14.24; 106/14.37; 106/284.1; 106/286.1; 525/403; 528/345; 510/421; 510/467; 510/475

(58) Field of Classification Search .............. 106/14.12, 106/14.15, 14.24, 14.37, 284.1, 286.1; 525/403; 528/345; 510/421, 467, 475
See application file for complete search history.

(56) References Cited

U.S. PATENT DOCUMENTS 4,831,176 A    5/1989   Holmberg et al. .......... 558/186
5,344,588 A    9/1994   Chane-Ching ........... 252/313.1
5,879,445 A    3/1999   Guicquero et al.
7,208,554 B2 *  4/2007   Wo et al. ..................... 525/403
2005/0227877 A1  10/2005  Wo et al.
2006/0167154 A1  7/2006   Bousseau et al.

FOREIGN PATENT DOCUMENTS

| EP | 1 482 330 A1 | 5/2004 |
| WO | WO 01/10918 A1 | 2/2001 |
| WO | WO 03/016217 | 2/2003 |
| WO | WO 2006/072743 A2 | 7/2006 |

OTHER PUBLICATIONS

C. Yee, G. Kataby, A. Ulman, T. Prozorov, H. White, A. King, M. Rafailovich, J. Sokolov, and A. Gedanken, "Self-Assembled Monolayers of Alkanesulfonic and -phosphonic Acids on Amorphous Iron Oxide Nanoparticles" (Langmuir, 1999, vol. 15, 7111-7115), Sep. 16, 1999.

Isabelle Dumazet-Bonnamour, Pierre Le Perchec "Colloidal Dispersion of Magnetite Nanoparticles via in situ Preparation with Sodium Polyoxyalkene di-Phosphonates" (Colloids and Surfaces, A: Physicochemical and Engineering Aspects, vol. 173 (2000) pp. 61-71), 2000 no month given.

Martin Mosquet, Yves Chevalier and Pierre Le Perchec "Functional Polyethylene Oxides as Dispersong Agents" (New Journal of Chemistry, vol. 21, No. 2, (1997), pp. 143-145), 1997 no month given.

Martin Mosquet, Yves Chevalier, Sylvain Brunel, Jean Pierre Guicquero, "Polyethylene Oxide di-Phosphonates as Efficient Dispersing Polymers for Aqueous Suspensions" (Journal of Applied Polymers Science, vol. 65, (1997), pp. 2545-2555, 1997 no month given.

* cited by examiner

*Primary Examiner*—Brian Mruk

(57) ABSTRACT

The instant invention relates to a liquid composition comprising a mixture of: (1) water and/or a polar solvent; (2) a colloidal dispersion of mineral particles; and (3) a phosphonate terminated poly(oxyalkene) polymer; the invention also relates to process for stabilizing aqueous and/or solvent-based dispersions of mineral particles comprising the step of adding an efficient stabilising amount of a phosphonate terminated poly(oxyalkene) polymer.

27 Claims, 2 Drawing Sheets

MINERAL PARTICLE DISPERSIONS STABILIZED WITH A POLY (OXYALKENE) PHOSPHONATE

Figure 1:

This application claims benefit of Provisional Application 60/667,176, filed Mar. 31, 2005.

The invention relates to mineral particle dispersions stabilized with a poly(oxyalkene) phosphonate, their method of preparation and their use.

Critical emerging nanomaterials utilize not only the chemical composition but also the size, shape and surface dependant properties of mineral particles, more particularly nanoparticles, in totally new applications with remarkable performance characteristics. Smaller than the wavelength of visible light, these nanoparticles have a broad range of applications from transparent UV-absorbing coatings, scratchproof or dirt-repellent surfaces, super-hard nanocomposites, photonic materials, and ultra-precise polishing aids, to fuel cells, highly effective catalysts and in automotive tires. In this entire spectrum of uses, mineral particles, more particularly nanoparticles need to be made available in a variety of formulation and processing conditions.

The commercial viability of nanoparticles dispersions, particularly aqueous and/or solvent metal oxide nanoparticle sols, has been severely limited so far by their inherent instability to perturbations in dispersion conditions. For aqueous systems, typical additives in formulations such as salt or surfactants, or changes in pH may result in aggregation and macroscopic precipitation of the nanoparticle suspension. For non-aqueous systems, changes in solvent conditions or other additive molecules may result in destabilization of the dispersion. In order to translate intrinsic properties to different uses there is a critical need for technologies to stabilize mineral nanoparticle dispersions in aqueous and/or solvent media.

Typically aqueous dispersions of metal oxide nanoparticles (as synthesized) are stable over a narrow range of pH. Current technologies approach stabilization by surface modification of the nanoparticles by coating them with a variety of polyfunctional charged or neutral molecules, which provide electrostatic or steric surface barriers respectively, to prevent aggregation. Some existing surface treatments may extend the range of pH stability to certain degrees while other molecules may desorb or be exchanged in certain conditions. An object of the instant invention is to provide an efficient and broadly applicable technological means of cost effective stabilization by strong complexing agents that may be applied to a range of different mineral particles, more particularly nanoparticles, in aqueous dispersions, while offering a wide range of stability within a broad range of pH.

Another object is to provide the above mentioned technology which is also applicable for solvent-based dispersions.

Another object of the instant invention is to provide aqueous paint compositions comprising a colloidal dispersion of cerium which are stable and which do not become colored upon storage upon exposure to light and/or UV. The stability referred to above as a goal, means that there is no visible change in pigmentation and no precipitation observable by the eye over time. These objectives and others, which will appear in what follows, are achieved by means of a process for obtaining stable aqueous and/or solvent-based dispersions of mineral particles, such that the process comprises of the step of adding to said mineral particles an efficient stabilising amount of a phosphonate terminated poly(oxyalkene) polymer. That polymer has a main complexing function to generate stable aqueous and/or solvent-based dispersions of mineral particles over a broad range of pH, ionic strengths, and solvent conditions.

More particularly the instant invention further relates to a liquid composition comprising a mixture of:

(1) a liquid medium comprising water and/or a solvent;

(2) a colloidal dispersion of mineral particles; and (3) a phosphonate terminated poly(oxyalkene) polymer (I) of the general structure of the formula:

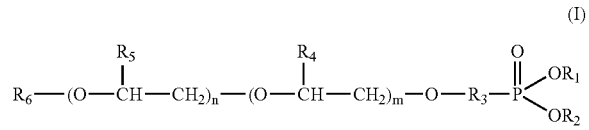

(I)

wherein $R_1$ and $R_2$ are independently H, $C_1$-$C_{20}$ alkyl, $C_3$-$C_{20}$ cycloalkyl, or $C_6$-$C_{20}$ aralkyl; $R_3$ is substituted or unsubstituted $C_2$-$C_{20}$ alkyl, $C_4$-$C_{20}$ cycloalkyl, or $C_8$-$C_{20}$ aralkyl; $R_4$ and $R_5$ are independently H or $C_1$-$C_2$ alkyl; $R_6$ is H, $C_1$-$C_{20}$ alkyl, $C_3$-$C_{20}$ cycloalkyl, or $C_6$-$C_{20}$ aralkyl; m and n are independently 0-200; and the moieties to which m and n are subscripted and refer to are either blocked, randomly spaced, or both along the chain between the $OR_3$ and $R_6$ groups.

The phosphonate terminated poly(oxyalkene) polymer used in the instant invention and the process of preparation thereof have been described in the U.S. provisional application Ser. No. 60/560,190, filed on Apr. 4, 2004, whose content is incorporated therein as a reference.

In a particular embodiment, the polymer (II) is of the formula:

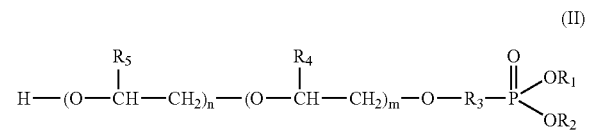

(II)

wherein $R_1$ and $R_2$ are independently H, $C_1$-$C_{20}$ alkyl, $C_3$-$C_{20}$ cycloalkyl, or $C_6$-$C_{20}$ aralkyl;

$R_3$ is substituted or unsubstituted $C_2$-$C_{20}$ alkyl, $C_4$-$C_{20}$ cycloalkyl, or $C_8$-$C_{20}$ aralkyl;

$R_4$ and $R_5$ are independently H or $C_1$-$C_2$ alkyl;

m and n are independently 0-200, and the moieties to which m and n are subscripted and refer to are either blocked, randomly spaced, or both along the polyoxyalkene chain.

The process for producing the phosphonates of formula I comprising the step of reacting a polyalkylene glycol alkenyl ether of the general structure of formula III with a phosphite having the general structure of formula IV in the presence of a radical initiator according to the following reaction scheme:

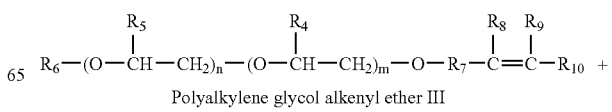

Polyalkylene glycol alkenyl ether III

-continued

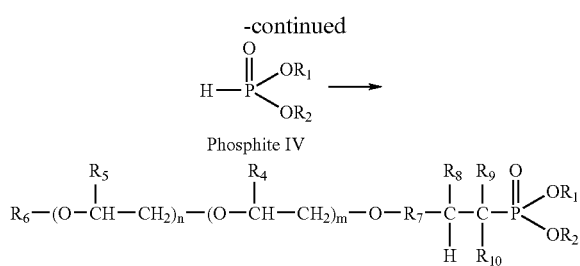

Phosphite IV

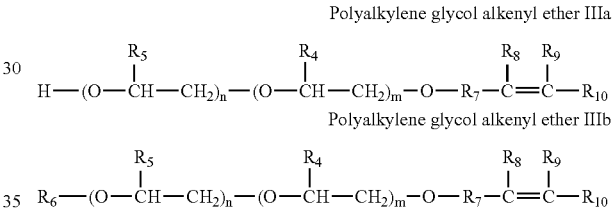

wherein $R_1$, $R_2$, $R_4$, $R_5$, $R_6$, m and n are as identified in formula I above and $R_7$, $R_8$, $R_9$, and $R_{10}$ are each independently H, $C_1$-$C_{20}$ alkyl, $C_3$-$C_{20}$ cycloalkyl, or $C_6$-$C_{20}$ aralkyl.

Preferred are when $R_1$ and $R_2$ are the same or different and are H, alkyl having from 1 to about 10 carbon atoms, cycloalkyl having from 3 to about 10 carbon atoms, or $C_6$-$C_{12}$ aralkyl carbon atoms. Illustrative of these preferred $R_1$ and $R_2$ substituents are alkyls, such as methyl, ethyl, propyl, isopropyl, n-butyl, sec-butyl, pentyl and its isomers, hexyl and its isomers, heptyl and its isomers, and the like; and cycloalkyls such as cyclobutyl, cyclopropyl, cyclohexyl, cyclopentyl, and the like.

The preferred $R_1$ and $R_2$ substituents may be substituted with one or more functional groups which are relatively non-reactive with the reactants, products, and additives employed in the process under process conditions. Illustrative of such non-reactive functional groups are phenyl, chloro, bromo, alkoxy, aryloxy, alkylthio, arylthio, alkylalkoxy, (e.g., methyl methoxy, methyl ethoxy, and methyl propoxy), cyano, carboxy, alkoxycarbonyl, perfluoroalkyl (e.g., trifluoromethyl) and the like.

Illustrative of the preferred $R_1$ and $R_2$ aralkyls are benzyl, phenylethyl, naphthylmethyl, naphthylethyl, and the like.

The preferred $R_3$ substituents are the $C_1$-$C_{10}$ alkyls, most preferably the methyl and ethyl moieties.

The preferred $R_6$ substituent is an alkyl having from 1 to about 10 carbon atoms, a cycloalkyl having from 3 to about 10 carbon atoms, or a $C_6$-$C_{12}$ aralkyl. Illustrative of these preferred $R_6$ substituents are alkyls, such as methyl, ethyl, propyl, isopropyl, n-butyl, sec-butyl, pentyl and its isomers, hexyl and its isomers, heptyl and its isomers, and the like; and cycloalkyls such as cyclobutyl, cyclopropyl, cyclohexyl, cyclopentyl, and the like.

Illustrative of the preferred $R_6$ aralkyls are benzyl, phenylethyl, naphthylmethyl, naphthylethyl, and the like.

The preferred $R_6$ substituent may be substituted with one or more functional groups which are relatively non-reactive with the reactants, products, and additives employed in the process under process conditions. Illustrative of such non-reactive functional groups are phenyl, chloro, bromo, alkoxy, aryloxy, alkylthio, arylthio, alkylalkoxy, (e.g., methyl methoxy, methyl ethoxy, and methyl propoxy), cyano, carboxy, alkoxycarbonyl, perfluoroalkyl (e.g., trifluoromethyl) and the like.

Illustrative of the preferred $R_6$ aralkyls are benzyl, phenylethyl, naphthylmethyl, naphthylethyl, and the like.

Preferably m and n are independently 0 to 100; most preferably 0 to 50.

Preferably the $R_7$, $R_8$, $R_9$, and $R_{10}$ substituents are the same or different and are H, alkyl having from 1 to about 10 carbon atoms, cycloalkyl having from 3 to about 10 carbon atoms, or aralkyl having from $C_6$-$C_{12}$ carbon atoms. Illustrative of these preferred substituents are alkyls, such as methyl, ethyl, propyl, isopropyl, n-butyl, sec-butyl, pentyl and its isomers, hexyl and its isomers, heptyl and its isomers, and the like; and cycloalkyls such as cyclobutyl, cyclopropyl, cyclohexyl, cyclopentyl, and the like.

Illustrative of the preferred $R_7$, $R_8$, $R_9$, and $R_{10}$ aralkyls are benzyl, phenylethyl, naphthylmethyl, naphthylethyl, and the like.

The preferred $R_7$, $R_8$, $R_9$, and $R_{10}$ substituents may be substituted with one or more functional groups which are relatively non-reactive with the reactants, products, and additives employed in the process under process conditions. Illustrative of such non-reactive functional groups are phenyl, chloro, bromo, alkoxy, aryloxy, alkylthio, arylthio, alkylalkoxy, (e.g., methyl methoxy, methyl ethoxy, and methyl propoxy), cyano, carboxy, alkoxycarbonyl, perfluoroalkyl (e.g., trifluoromethyl) and the like.

The polyalkylene glycol alkenyl ether starting reactants (III) suitable for preparing the compositions and compounds of this invention can be divided into two categories: one wherein the polyalkylene glycol has one end capped with an alkenyl group and the other end as a free hydroxyl group as depicted in the general formula (IIIa); and the second type wherein the polyalkylene glycol has one end capped with an alkenyl group and the other end capped with an alkyl, cycloalkyl, or aralkyl group as depicted in the general formula (IIIb).

Polyalkylene glycol alkenyl ether IIIa $$H-(O-\underset{R_5}{\overset{|}{C}H}-CH_2)_n-(O-\underset{R_4}{\overset{|}{C}H}-CH_2)_m-O-R_7-\underset{R_8}{\overset{|}{C}}=\underset{R_9}{\overset{|}{C}}-R_{10}$$

Polyalkylene glycol alkenyl ether IIIb $$R_6-(O-\underset{R_5}{\overset{|}{C}H}-CH_2)_n-(O-\underset{R_4}{\overset{|}{C}H}-CH_2)_m-O-R_7-\underset{R_8}{\overset{|}{C}}=\underset{R_9}{\overset{|}{C}}-R_{10}$$

wherein the R's, m, and n are as identified in formula III above.

In both cases, the polyalkylene oxide structure can consist of homopolymers of ethylene oxide, propylene oxide, or butylene oxide or copolymers of these monomers including random or block grouping of these ethylene oxide, propylene oxide, or butylene oxide moieties. Examples of the polyalkylene glycol alkenyl ether reactants include:

polyethylene glycol allyl ether (MW 498);
polyethylene glycol allyl ether (20 mols EO, 5 mols PO);
polyethylene glycol allyl methyl ether (MW 250);
polyethylene glycol allyl methyl ether (MW 350);
polyethylene glycol allyl methyl ether (MW 500);
polyethylene glycol allyl methyl ether (MW 1100);
polyethylene glycol allyl methyl ether (20 mols EO, 20 mols PO);
polyethylene glycol allyl butyl ether (25 mols EO, 8 mols PO);
polyethylene glycol vinyl ether (MW 440); and
polyethylene glycol vinyl methyl ether (MW 456).

Examples of the Phosphite (IV) include phosphorous acid, monoalkyl or monoaryl hydrogen phosphite such as monomethyl hydrogen phosphite, monoethyl hydrogen phosphite, monophenyl hydrogen phosphite, and dialkyl hydrogen phosphite such as dimethyl hydrogen phosphite, diethyl hydrogen phosphite, diisopropyl hydrogen phosphite, dibutyl hydrogen phosphite, and diphenyl hydrogen phosphite, and mixed esters such as methyl ethyl hydrogen phosphite. Dialkyl hydrogen phosphites are preferred due to their high reactivity compared to the other phosphites.

Preferable dialkyl hydrogen phosphites include dimethyl hydrogen phosphite and diethyl hydrogen phosphite.

The reaction is preferably carried out in the presence of a radical initiator. Typical initiators are those well known in the art such as di-tbutyl peroxide, dibenzoyl peroxide, 2,2'-azobisisobutyronitrile (AIBN), and sodium persulfate.

The reaction can be carried out in the presence of a solvent such as water, a typical organic solvent, or neat.

The temperature employed in the preparation process can be varied widely depending on factors known to those skilled in the art. Reaction generally will be carried out at a temperature greater than 60° C. Reaction temperatures from about 60° C. to about 160° C. are preferred, most preferably from about 80° C. to about 140° C.

The reaction may be carried out at atmospheric pressure or above atmospheric pressure in a sealed vessel. For convenience, and to ease removal of certain by-products during the reaction if so desired, the reaction is preferably carried out above atmospheric pressure.

The process of preparation is conducted for a period of time sufficient to produce the desired compound in adequate yield. Reaction times are influenced to a significant degree by the choice of radical initiator; the reaction temperature; the concentration and choice of reactants; and other factors known to those skilled in the art. In general, reaction times can vary from a few hours to several days or longer.

The process can be conducted in a batch, semi-continuous or continuous fashion. The reaction can be conducted in a single reaction zone or in a plurality of reaction zones, in series or in parallel; or it may be conducted intermittently or continuously in an elongated tubular zone or series of such zones. The materials of construction employed should be inert to the reactants during the reaction and the equipment should be fabricated such that it is able to withstand the reaction temperatures and pressures.

When the starting alkenyl ether in the syntheses of this invention is type IIIa, i.e., the polyoxyalkene moiety is hydroxy terminated, it may be necessary to protect the hydroxyl moiety to prevent the undesired esterification or transesterification reaction between the hydroxyl group and the phosphite (IV). Protective compounds for the hydroxyl group, which are subsequently easily removed, are well known in the art. One method that is effective is to use acetic anhydride as the protective compound as outlined in the schematic below.

The high concentration of the polyalkoxylated phosphonate with its lack of steric hinderance on the phosphonate moiety, realizes a final product composition with extraordinarily enhanced complexation to mineral oxides. When one attempts to prepare the products of the instant invention by a Michaels-Arbuzov reaction of trialkyl phosphite with polyoxyalkene containing alkyl halides, for example, the yields are not only significantly lower because of the formation of undesired phosphonate by-products, but a significant amount of undesirable, and extremely difficult to remove unidentifiable impurities result. In addition, the higher temperatures utilized, by necessity, in the Arbuzov reaction process make it extremely difficult, if not impossible to prepare the hydroxyl terminated products of this invention for the hydroxyl group at those temperatures actively reacts with, i.e., attack any available phosphite linkage.

The liquid medium (1) of the liquid composition of the instant invention may be water or a solvent or a mixture of water and solvent.

A mixture of organic solvents can be used.

Preferably a polar organic solvent is used.

There may be mentioned in particular as specific examples:

the optionally hydroxylated nitrogenous type compounds such as: ethylene diamine, NMP (N-methylpyrrolidone), pyridine, MEA (monoethanolamine), diethanolamine, triethanolamine, tert-butyl diethanolamine, isopropanolamine, 2-amino-1-propanolamine, 3-amino-1-propanolamine, isobutanolamine, 2-amino-2-ethoxyethanol, DGA [diglycolamine or 2-(2-aminoethoxy)ethanol], alcohol and/or ether and/or ester type compounds such as: ethanol, propanol, butanol, ethyl acetate, propyl acetate, butyl acetate, ethylene glycol, propylene glycol, TEG [triethylene glycol], glyme, diglyme, PGMEA [propylene glycol monomethyl ether acetate or 2-(1-methoxy)propyl acetate], PGME [propylene glycol monomethylether], ethyl lactate, anisole, methyl adipate, cyclopentanol, hydrocarbon type compounds such as toluene, xylene, ketone type compounds such as acetone, dimethyl ketone, methyl ethyl ketone, 2-pentanone, cyclopentanone, cyclohexanone, mesityl oxide, dimethyl sulphoxide.

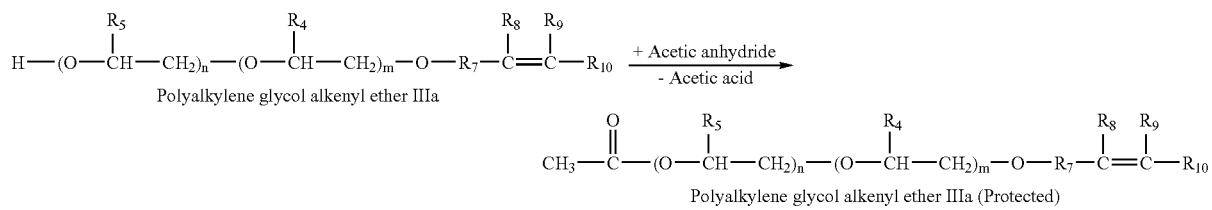

With that preparation process, one is able to not only realize significantly higher yields of the polyalkoxylated phosphonate in the final product composition than that realized by other approaches to synthesizing the product, but also, serendipitously, the instant process is able to achieve in a simple reaction scheme, hydroxyl end capping of the polyoxyalkene chain with all of the attendant advantages associated with the presence of such an end group, such as high aqueous solubility and the availability of a reactive group for further molecular modification if so desired.

The mineral particles can be amphoteric, anionic or cationic. Preferably, the particles are cationic. The mineral is preferably a metal and more preferably an oxide thereof. In that connection, substantially any "metal" capable of forming a metal oxide may be used to form the metal oxide particles. Suitable metallic elements include, among others, niobium, indium, titanium, zinc, zirconium, Aluminum, tin, cerium, hafnium, tantalum, tungsten, and bismuth. Also suitable in place of the metal in the oxide is the semi-metallic compound, silicon.

The molar ratio between the phosphonate molar equivalent of the phosphonate polymer (3) and the moles of total metal oxides of the dispersion is of between 0.001 and 10.0, preferably between 0.1 and 1.5.

The metal oxides may be made of a single metal, or may be a combination of metals, such as cerium, aluminum, zirconium, phosphorus, gallium, germanium, barium, strontium, yttrium, antimony, and cesium. Preferred metal oxide particles comprise zirconium oxide, aluminium oxide and cerium oxide. The metal oxide particles may be prepared using any known methods, such as "sol-gel" techniques, direct hydrolysis of metal alkoxides by water addition, forced hydrolysis of relatively low-cost metal salts, or non-hydrolytic reactions of metal alkoxides with metal halide salts.

The terms "aqueous or solvent-based dispersions of mineral particles" mean all systems formed of fine solid mineral particles, more particularly of metal oxides particles having colloidal sizes, in suspension in an aqueous or solvent-based phase, which may be different or identical to the liquid medium (1) of the composition of the instant invention. The term particle used in the instant specification encompasses discrete particles or aggregates of particles. Those particles may further comprise residual quantities of ions linked or absorbed like nitrate, acetate or ammonium ions. Colloidal sizes refer to particle sizes of between 1 nm and 5000 nm. It should be noticed that in the above defined dispersion, metal oxide may be utterly in a colloidal form or in the form of ions and colloids at the same time.

According to the instant invention, the phosphonated poly(oxyalkene) of formula I are present with mineral particles in an "efficient amount". By "efficient amount", it is meant an amount sufficient to realize a noticeable increase in the property desired of dispersing the particles in a desired medium. The molar ratio between the phosphonate molar equivalent of the phosphonate polymer (3) and the moles of total metal oxides of the dispersion is of between 0.001 and 10.0, preferably between 0.1 and 1.5.

In another aspect, the instant invention further relates to a process for stabilizing aqueous and/or solvent-based dispersions of mineral particles comprising the step of adding to said dispersions, an efficient stabilising amount of a phosphonate terminated poly(oxyalkene) polymer of the general structure of the formula I:

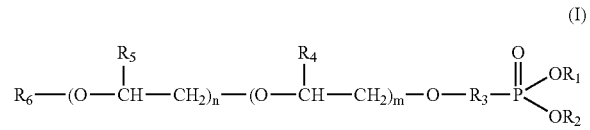

(I)

wherein $R_1$ and $R_2$ are independently H, $C_1$-$C_{20}$ alkyl, $C_3$-$C_{20}$ cycloalkyl, or $C_6$-$C_{20}$ aralkyl; $R_3$ is substituted or unsubstituted $C_2$-$C_{20}$ alkyl, $C_4$-$C_{20}$ cycloalkyl, or $C_8$-$C_{20}$ aralkyl; $R_4$ and $R_5$ are independently H or $C_1$-$C_2$ alkyl; $R_6$ is H, $C_1$-$C_{20}$ alkyl, $C_3$-$C_{20}$ cycloalkyl, or $C_6$-$C_{20}$ aralkyl; m and n are independently 0-200; and the moieties to which m and n are subscripted and refer to are either blocked, randomly spaced, or both along the chain between the $OR_3$ and $R_6$ groups.

The polymer may be of the formula:

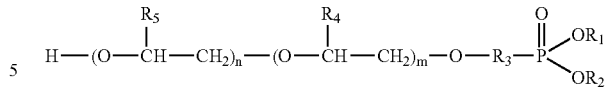

wherein $R_1$ and $R_2$ are independently H, $C_1$-$C_{20}$ alkyl, $C_3$-$C_{20}$ cycloalkyl, or $C_6$-$C_{20}$ aralkyl;

$R_3$ is substituted or unsubstituted $C_2$-$C_{20}$ alkyl, $C_4$-$C_{20}$ cycloalkyl, or $C_8$-$C_{20}$ aralkyl;

$R_4$ and $R_5$ are independently H or $C_1$-$C_2$ alkyl; m and n are independently 0-200, and the moieties to which m and n are subscripted and refer to are either blocked, randomly spaced, or both along the polyoxyalkene chain.

In that stabilization process, the phosphonate polymer is preferably added in a liquid medium, especially one in which the phosphonate is at least partially soluble and more especially is either water or an organic liquid which is miscible with water including mixtures thereof.

That liquid may be identical with the liquid medium (1) of the liquid composition of the instant invention.

In that stabilization process the dispersion is in water and/or an organic solvent, for example: ethanol, propanol, butanol, ethyl acetate, propyl acetate, butyl acetate, ethylene glycol, propylene glycol, triethylene glycol, or cyclopentanol.

The mineral particles are preferably cationic and/or metal oxide particles as defined above.

In carrying out that process, the molar ratio is preferably between the phosphonate molar equivalent of the phosphonate polymer (3) and the moles of total metal oxides of the dispersion is of between 0.001 and 10.0, more preferably, between 0.1 and 1.5.

The particle size of the particle dispersion is of at most 5000 nm, preferably at most 200 nm.

The dispersion may be in water and have a pH of between 1 and 10.

According to another embodiment, the instant invention also relates to paint or varnish compositions comprising a liquid composition of the invention or an aqueous and/or solvent-based dispersions of mineral particles stabilized by the process of the invention.

In a specific embodiment, the mineral particles are cerium oxide particles and the dispersions are aqueous-based. The cerium is present in the dispersion generally in the form of oxide and/or hydrated oxide (hydroxide) of cerium. The particles of the cerium dispersion have a size of preferably at most 200 nm, more preferably of at most 100 nm. These sizes are measured by dynamic light scattering (DLS), optionally completed, if necessary, by small angle x-ray scattering (SAXS) and cryo-transmission electron microscopy (cryo-TEM). A particular cerium compound and the corresponding sols and dispersions thereof, well adapted for the instant invention and for the preparation of suitable aqueous colloidal sols are described in U.S. Pat. No. 5,344,588 whose content is hereby incorporated by reference in the instant specification.

These cerium oxide dispersions stabilized by the phosphonate polymer according to the instant invention, may be used in paints, lacquers and varnishes.

The term "paint" is intended to mean any polymer coating deposited on a substrate and protecting the substrate.

That term encompasses aqueous paints, lacquers and varnishes. The terms "lacquers" and "varnishes" have the usual meaning in the targeted technical area. A lacquer generally means a transparent or semi-transparent formulation coated on a wooden substrate to protect the same and having a dry extract of the order of 10% by weight or 40 to 50% by weight if it is a primary or a finishing lacquer respectively.

A varnish is a more concentrated formulation than a lacquer. According to the instant invention, the term "paint" also includes monomers or resins in emulsion like alkyd resins such as glyceropthalic resin, long or short oil modified resins, acrylic resins derived from acrylic or methacrylic acid esters, optionally copolymerised with ethyl acrylate, ethyl-2 hexyl or butyl, acrylic-isocyanate resins, vinyl resins, polyvinyl acetate, polyvinyl chloride, vinyl chloride/vinyl acetate copolymers, vinyl chloride/vinylidene chloride copolymers, aminoplast resins, phenolic resins, polyester resins, polyurethane resins, epoxy resins, silicone resins and cellulose or nitrocellulose resins.

The instant invention may apply to all kinds of aqueous paints coated on all kinds of substrate. That substrate can be wood, metals for car paints, glass, glass used in buildings. Other substrates can be coatings on organic or mineral products to keep their transparency in the domain of visible light. Other substrates may be synthetic or natural fibers and fabrics coated with the resins as cited above.

The invention applies more particularly to lacquers crosslinkable under UV, i.e. lacquers being immediately crooslinked and dried under UV radiation just after having being coated on the substrate, more particularly a wooden substrate.

The colloidal dispersions used in the instant invention present specific features. They present an inorganic particle in conjunction with a particular phosphonate polymer and a base which may be ammoniac or an amine. That polymer interacts with the cerium cation by any kind of link or bond, including coordination, ionic or electrostatic bonds. Thus, the polymer may be present on the particles of the cerium compound and/or inside the particles of cerium and/or in the aqueous phase.

The quantity of dispersion added to the paint depends upon the final rate of cerium oxide wanted in the composition. That rate can vary a great extent. It is possible to use relatively large quantities of cerium without hampering the water resistance or the mechanical strength of the paint. Generally the added colloidal dispersion has a quantity by weight of cerium oxide of at most 60%, preferably of at most than 50% and even more preferably of at most 3% based on the total weight of the composition. Such a quantity is sufficient to obtain paint, a lacquer, or a varnish providing a good protection to the substrate, for example wood, against UV during a long period of time.

Figure 2:
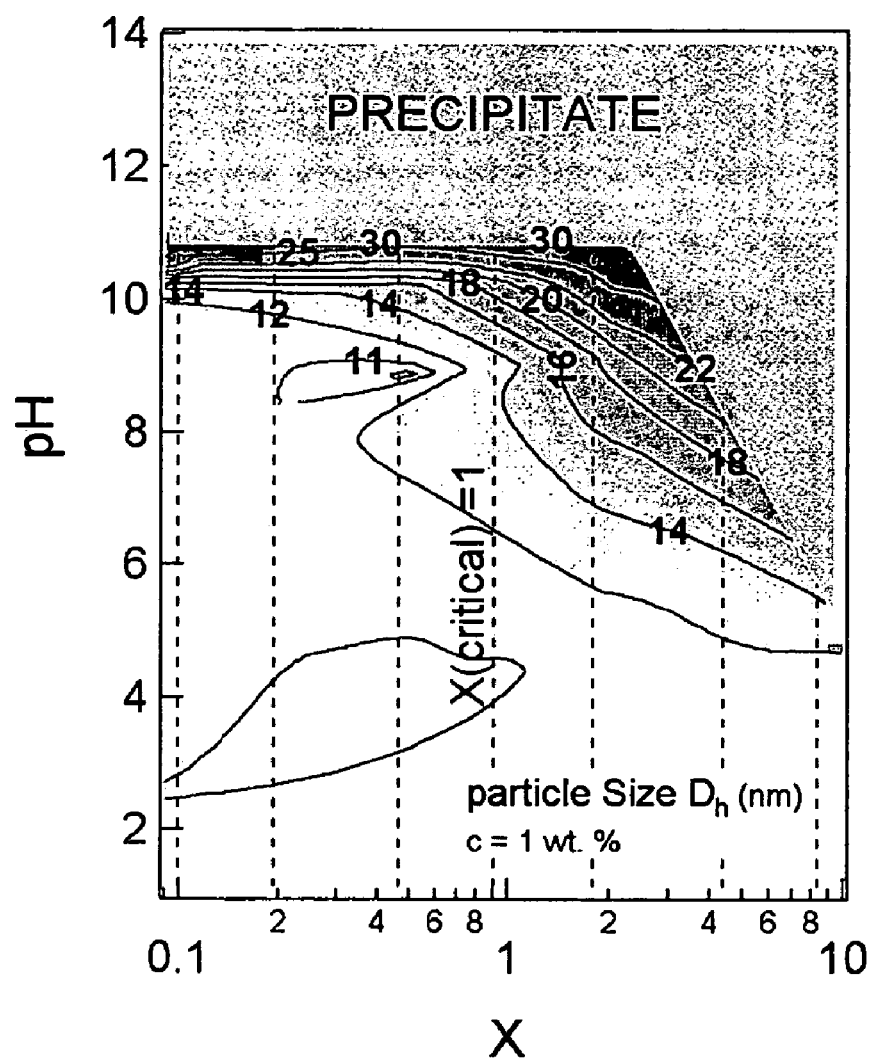
Figure 3:
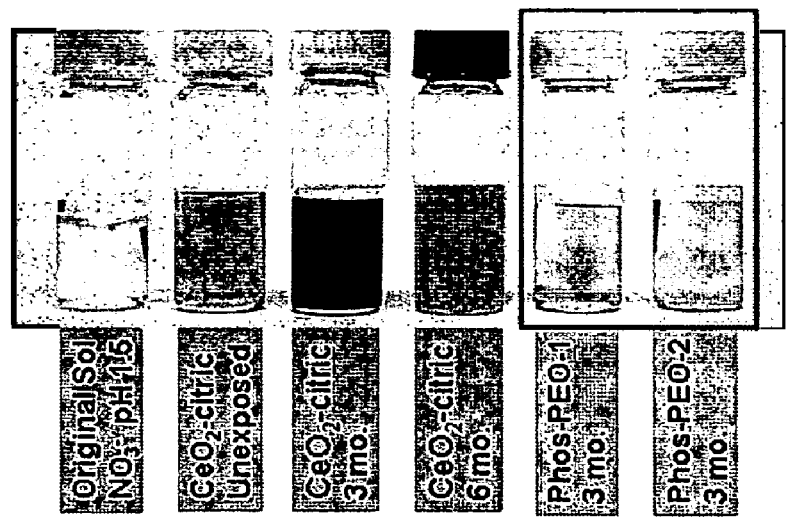
Figure 4:
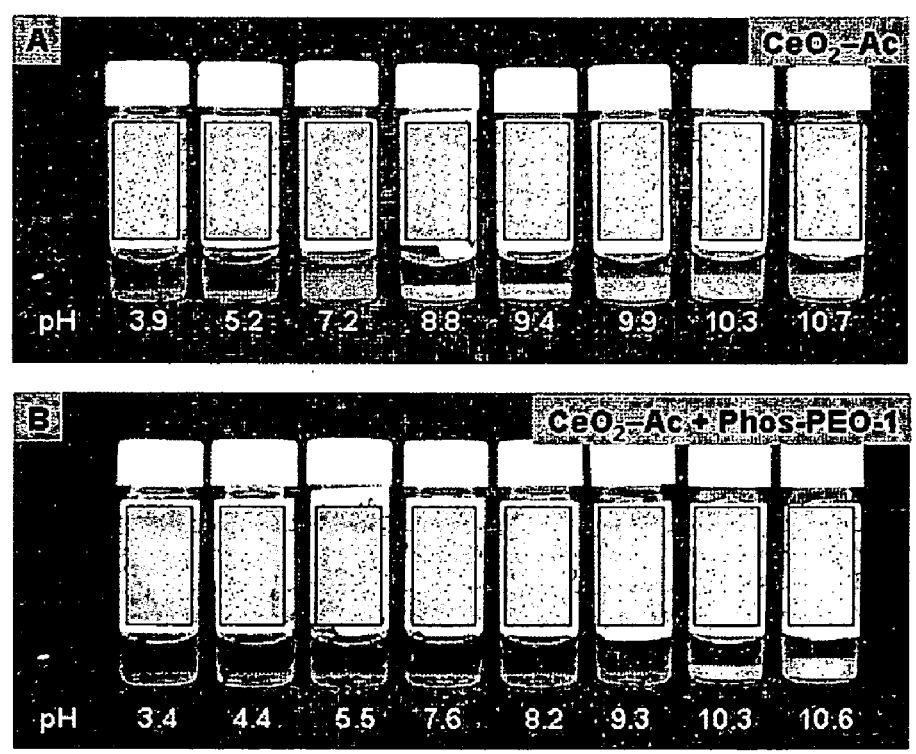

The following examples further illustrate the invention, reference is made to the accompanying drawing, wherein the term Phos-PEO refers to a particular phosphonated poly(oxyalkene) where the oxyalkene is an ethylene oxide, and wherein:

FIG. 1 shows complexes of cerium oxide nanoparticles with Phos-PEO-1 at X=0.5, cerium oxide=0.1%, and at different pH by adding NH$_4$OH;

FIG. 2 shows a two dimensional map of how the stability of the mixture of cerium oxide nanoparticles and Phos-PEO-1 changes with pH based on the relative mass ratio X=Mass$_{particle}$/Mass$_{Phos-PEO}$ FIG. 3 shows pictures of samples illustrating that the CeO$_2$-Phos-PEO-1 and the CeO$_2$-Phos-PEO-2 complexes have a light yellow color; and FIG. 4 shows pictures of samples illustrating that dilution and complexation with Phos-PEO-1 at constant pH by simple mixing at X=1 results in a dramatic subsequent increase in the range of pH stability of the formulation to pH 10.

EXAMPLE 1

This example relates to the use of poly(oxyalkene) phosphonates for stabilizing aqueous colloidal dispersions of cerium oxide nanoparticles prepared by the process as described in U.S. Pat. No. 5,344,588. The colloidal dispersion of the bare cerium oxide nanoparticles as synthesized (i.e. without any organic or inorganic coating on the surface of the particle) are available at pH 1.5. The dispersion however precipitates as the pH is increased to pH 3 by the addition of base (as ammonium hydroxide, NH$_4$OH). Two molecules with the structure shown below and designated as Phos-PEO-1 and phos-PEO-2 are used to counter the problem.

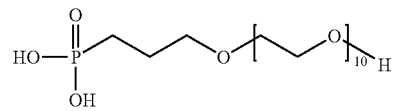

(PHOS-PEO-1)

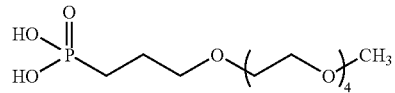

(PHOS-PEO-2)

The molecules conform to the general structure in formula (I) and present a unique geometry of an ionic complexing Phosphonate headgroup with a neutral tail that has 10 or 4 ethylene oxide monomers.

cerium oxide nanosols are simply mixed at pH 1.5 with Phos-PEO-1 or Phos-PEO-2 at the mass ratio X=Mass$_{particle}$/Mass$_{phos-PEO}$=1 to give clear stable dispersions.

There is no characteristic precipitation normally associated with complexation with the surface. The phosphonate function constitutes a strongly complexing sticker on the cationic cerium oxide surface resulting in a neutral end grafted brush-like PEO layer.

Significantly, this solvating brush-like layer is sufficient to solublize the particles in water.

Increasing the pH with the addition of base to cerium oxide nanoparticles complexed with both Phos-PEO-1 and Phos-PEO-2 gives clear stable dispersions from pH 1 to pH 10 as shown in FIG. 1. FIG. 1 shows complexes of nanoceria with Phos-PEO-1 at X=0.5, cerium oxide=0.1%, and at different pH by adding NH$_4$OH. At pH 11 the dispersion becomes unstable with visibly evident precipitation.

Stability with pH: Role of Mixing Ratio and Concentration of Mixing

FIG. 2 shows a two dimensional map of how the stability of the mixture of cerium oxide nanoparticles and Phos-PEO-1 changes with pH based on the relative mass ratio X=Mass$_{particle}$/Mass$_{phos-PEO}$. This map shows dynamic light scattering measurements of how the particle sizes (hydrodynamic diameter, D$_h$) evolve due to aggregation depending on the solution conditions. At all values of X at pH 1.5 (0.01 to 100), the complexation yields single particles (D$_h$=10 nm; Bare CeO$_2$ particles=9 nm) with a swollen PEO corona. Colloidal bridging does not occur for the non-interacting PEO backbone and one terminal complexation site. The particle sizes are also invariant with the concentration of mixing suggesting processing advantages making concentrated sols of single particles readily accessible. Extending the entire data of $D_h$ with X to another dimension by systematic variation of pH generates a 2D map of stability of $CeO_2$-Phos-PEO-1 complexes. At low X, as pH is progressively increased, the solutions get destabilized at pH>10.5. This is a critical upper stability limit of pH. Another feature of this 2D diagram is the existence of a critical X(critical)=1. For all values of X>1 the particle size increases progressively at a lower pH leading to early phase separation or aggregation. A minimum surface coverage of the particle with Phos-PEO-1 is essential. A similar complex contour map for $CeO_2$-PEO-2 shows aggregation above a critical mixing ratio X(critical)=3. Below X=3 the nanoceria-Phos-PEO-2 are measured to be hybrid single particles ($D_h$=11 nm) up to pH 10. As with Phos-PEO-1 there is aggregation at pH>10 for X<Xc which At pH>10 the postulated mechanism of aggregation may be through desorption of the phosphonates.

When compared to Phos-PEO-1 this critical ratio is higher for the lower molar mass Phos-PEO-2. Though this is expected for the lower molar mass, the ratio of molar masses is $M_w$(Phos-PEO-1)/$M_w$(Phos-PEO-2)=581/331=1.75. This is lower than the ratio X(critical,Phos-PEO-1)/X(critical, Phos-PEO-2)=3 that is observed. This may be ascribed to the slightly hydrophobic character of the Phos-PEO-2 that may partition to the particle interface in a much more effective manner.

Complexation with phosphonate terminated PEO (PHOS-PEO-1 and Phos-PEO-2)as synthesized allows stability in dispersions of cerium oxide nanoparticles from pH 1-10 with some key processing advantages.

Stability of Color in Ambient Light

The $CeO_2$-Phos-PEO-1 and the $CeO_2$-Phos-PEO-2 complexes have a light yellow color that does not degrade in time when exposed to ambient light on the benchtop (FIG. 3). Though the origin of the color of $CeO_2$ complexes and the degradation for $CeO_2$-citric acid is not known at this time ($CeO_2$ has a slight intrinsically yellow color), it is observed that the phosphonate poly(oxyalkene) complexes are initially similarly colored to unexposed $CeO_2$-citric acid.

FIG. 3 highlights how the phosphonated poly(oxyalkenes) such as Phos-PEO-1 and Phos-PEO-2 give stable complexes with nano-CeO2. Comparison of color/stability in ambient light is shown in a sample array from left to right: original CeO2 nanosol $D_h$=9 nm, pH 1.0, 151.5 g/L; $CeO_2$-citric acid unexposed to ambient light, pH 8.4, 200 g/L, $D_h$=8 nm; $CeO_2$-citric acid exposed to ambient light on the benchtop turns dark brown; $CeO_2$-citric acid at 6 months exposure to ambient light precipitates to form an opaque gel; $CeO_2$-Phos-PEO-2 color is stable over 3 months, 200 g/L, pH 8.5, Dh=10 nm.

Advantages

1) Color/degradative stability is improved compared to $CeO_2$-citric acid in ambient light. This may be critical for coating applications.

2) Broad range of pH stability from acidic to basic, pH 1-pH 10.

3) Processing ease—NO precipitation redispersion is required as in the case with complexation citric acid. Simple mixing is sufficient at pH 1.5.

4) No aggregation—The geometry of a single ionic sticker grafting to the particle interface precludes aggregation. With sufficient grafting density the complexes are stable over the extended pH range.

EXAMPLE 2

This example relates to the formation of colloidal complexes of cerium oxide nanoparticles with Phos-PEO-1 and Phos-PEO-2 and the formulation stability of liquid compositions containing these complexes, and comparison with $CeO_2$-citric acid complexes described in WO 03/099942.

Effect of Ionic strength. Bare aqueous $CeO_2$ sols are stabilized by merely the repulsive electrostatic interaction of the surface charges to counter the attractive van der Waals interaction. Increase in ionic strength causes precipitation of the sol at salt ($NaNO_3$) concentrations [NaNO3]=0.15 M. When benchmarked against bare nano-ceria $CeO_2$-Phos-PEO-1 complexes are remarkably insensitive to ionic strength (up to 2N $NaNO_3$). The geometry of an extended neutral brush provides a steric barrier and alters the interparticle pair-potential profile sufficiently to prevent any aggregation. Slight aggregation at salt concentrations of $NaNO_3$=2N may be due to reduced solubility of the PEO backbone at extremely high ionic strengths.

The cerium oxide-Phos-Peo-2 complexes are prepared at X(critical)=3 and compared to cerium oxide-Phos-PEO-1 complexes (X(critical)=1) as it represents the limit of stabilization and having a minimal amount of residual phosphonated polyoxyalkenes in solution. Even at this limit of stability the Phos-PEO-2 complexes as with the $CeO_2$-Phos-PEO-1 are remarkably insensitive to ionic strength at least up to [$NaNO_3$]=1.5 N. At X=3 the sols are apparently covered sufficiently with a layer of Phos-PEO-2 to prevent aggregation.

Effect of Surfactant.

In contrast with the anionic $CeO_2$-citric acid complexes which predictably precipitate in the presence of cetyltrimethylammonium bromide (CTAB), a cationic surfactant, the $CeO_2$-Phos-PEO-1 stabilized sols are completely unperturbed. The $CeO_2$-citric acid complexes are prepared using the routes to stabilization mentioned in example 1 with anionic polyfunctional acids. CeO2-Phos-PEO-1 complexes are unperturbed by the presence of sodium dodecylsulfate micelles even at nominally high concentrations. These experiments are designed to test the robustness of the complexation to competitive interactions or exchange of the phosphonate by the sulfate head groups. The bare nanoparticles are of course comparatively intolerant to the presence of anionic surfactants. Complexation by any one of these modalities therefore provides formulation stability in the presence of relatively weakly coupling anionic surfactants. As mentioned earlier, neutral $CeO_2$-Phos-PEO-1 complexes are tolerant to the presence of anionic and cationic surfactants.

Mixed Polar Solvents. The $CeO_2$-Phos-PEO-1 and the $CeO_2$-Phos-PEO-2 complexes are also stable in the presence of polar water miscible organic solvents such as ethanol, 2-butanol, and acetone. Concentrated sols at ~260 g/L at were directly dissolved in 2-butanol to a final concentration of 50 g/L at acidic pH. These dispersions in mixed solvents may directly be mixed with resins for nanocomposite coatings. These formulations may be made at any pH between pH1 and pH 10 The use of ceria nanoparticles at acidic pH (3-7) prior to the synthesis of the complexes with the Phos-PEO was impossible with resins in this pH range.

EXAMPLE 3

This example relates to the use of phosphonated poly(oxyalkenes)for extending the range of pH stability of inorganic ceria nanoparticles modified by the presence of acetic acid.

Acetic acid stabilized colloidal ceria nanoparticles $CeO_2$—Ac; $[CeO_2]$=20 wt %; $[CH_3COOH]$=3%; particle size=15 nm) are available at pH=3. The complexation with the monofunctional acetate apparently increases the range of pH stability compared to the bare cerium oxide nanoparticle. This sol quickly becomes unstable on the addition of base ($NH_4OH$) at approximately pH 5 (particle size increases to 22 nm) with self-evident aggregation at pH 7 by the formation of a cloudy white precipitate. This aggregation with pH is shown in FIG. 4. Dilution and complexation with Phos-PEO-1 at constant pH by simple mixing at X=1 results in a dramatic increase in the range of pH stability of the formulation to pH 10.

FIG. 4A shows the pH stability of colloidal $CeO_2$—Ac on addition of $NH_4OH$. [CeO2]=1 wt %; [Acetate]=0.15 wt %. FIG. 4B highlights that complexation of $CeO_2$—Ac with Phos-PEO-1 extends the range of stability from pH 3 to pH 10. [CeO2]=1 wt %; X=1.

Clear sols are obtained over the entire range (pH 3-10) with a constant Dh=18.2 nm that is consistent with the formation of an end-grafted PEO corona around the particles.

EXAMPLE 4

This example relates to the use of phosphonated poly(oxyalkenes)for extending the range of pH stability of other cationic inorganic nanoparticles such as zirconium-oxide, aluminum oxide, and aluminum oxide coated silica nanoparticles.

To further extend the envelope of utility of the Phos-PEO-1 or Phos-PEO-2 for stabilizing nanosols, similar competitive exchange experiments are possible on acetate stabilized colloidal Zirconium Oxide nanoparticles ($ZrO_2$—Ac) that present an entirely different surface chemistry compared to cerium oxide nanoparticles. The commonality being the cationic surface charge, the zirconium oxide nanoparticles are a clear colorless solution when compared to the relatively yellow coloration of the nanoceria. Like cerium oxide nanoparticles they provide UV absorbance though to a lesser extent. Available at pH 3.5 ($D_h$=4.5 nm; $[ZrO_2]$=20%; $[CH_3COOH]$=15%; 10 cP) the diluted sols are unstable with pH with macroscopic aggregation observable at pH ~5. Complexation with Phos-POA-1 (X=0.25) dramatically extends the range of pH stability of the Zirconia sols up to pH 9. These are now made accessible to coatings applications. As another example of inorganic nanoparticles colloidal Alumina nanoparticles (AL2ODW–diameter=50 nm) are available in Nitric acid pH 4.0; 23.5%. Simple increase in pH by addition of base results in precipitation of the nanoparticles at pH ~7. Addition of Phos-PEO-1 to the nanoparticle dispersion in 1:1 mass fraction yield stable dispersions up to pH 10, again demonstrating that the complexation and stabilization is generally applicable to a wide variety of cationic nanoparticles. Similarly, cationically modified silica available at pH 4.5 when treated with Phos-PEO-1 at X=1 results in extending the range of pH stability from pH ~7 to pH 9.6.

The invention claimed is:

1. A liquid composition comprising a mixture of:
    (1) a liquid medium comprising water and/or a solvent;
    (2) a colloidal dispersion of mineral particles; and
    (3) a phosphonate terminated poly(oxyalkene) polymer of the general structure of the formula I:

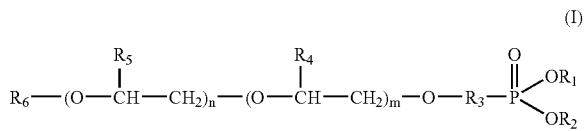

(I)

wherein $R_1$ and $R_2$ are independently H, $C_1$-$C_{20}$ alkyl, $C_3$-$C_{20}$ cycloalkyl, or $C_6$-$C_{20}$ aralkyl; $R_3$ is substituted or unsubstituted $C_2$-$C_{20}$ alkyl, $C_4$-$C_{20}$ cycloalkyl, or $C_8$-$C_{20}$ aralkyl; $R_4$ and $R_5$ are independently H or $C_1$-$C_2$ alkyl; $R_6$ is H, $C_1$-$C_{20}$ alkyl, $C_3$-$C_{20}$ cycloalkyl, or $C_6$-$C_{20}$ aralkyl; m and n are independently 0-200; and the moieties to which m and n are subscripted and refer to are either blocked, randomly spaced, or both along the chain between the $OR_3$ and $R_6$ groups.

2. The composition according to claim 1, wherein the polymer (3) is of the formula:

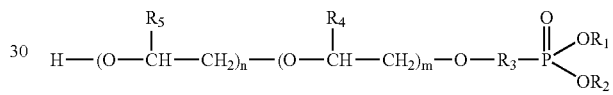

wherein $R_1$ and $R_2$ are independently H, $C_1$-$C_{20}$ alkyl, $C_3$-$C_{20}$ cycloalkyl, or $C_6$-$C_{20}$ aralkyl;
    $R_3$ is substituted or unsubstituted $C_2$-$C_{20}$ alkyl, $C_4$-$C_{20}$ cycloalkyl, or $C_8$-$C_{20}$ aralkyl;
    $R_4$ and $R_5$ are independently H or $C_1$-$C_2$ alkyl;
    m and n are independently 0 200, and the moieties to which m and n are subscripted and refer to are either blocked, randomly spaced, or both along the polyoxyalkene chain.

3. The composition according to claim 1, wherein (1) is a polar organic solvent.

4. The composition according to claim 3, wherein the solvent is ethanol, propanol, butanol, ethylene glycol, propylene glycol, triethylene glycol, glyme, diglyme, ethyl acetate, propyl acetate, butyl acetate, propylene glycol monomethyl ether acetate, propylene glycol monomethyl ether 2-(1-methoxy)propyl acetate, propylene glycol monomethylether, ethyl lactate, anisole, methyl adipate, or cyclopentanol.

5. The composition according to any of claims 1 to 4, wherein the mineral particles are cationic.

6. The composition according to any of claims 1 to 4, wherein the mineral particles are metal oxide particles.

7. The composition according to claim 6 wherein the mineral particles are metal oxide particles and wherein the metal is aluminum, zirconium, phosphorus, gallium, cerium, germanium, barium, strontium, yttrium, antimony, cesium, or a combination thereof.

8. The composition according to claim 1 wherein the mineral particles are metal oxide particles and wherein the molar ratio between the phosphonate molar equivalent of the polymer (3) and the moles of total metal oxides of the dispersion is of between 0.00 1 and 10.0.

9. The composition according to claim 8, wherein the molar ratio, is of between 0.1 and 1.5.

10. The composition according to claim 1, wherein the particle size of the particle dispersion is of at most 5000 nm.

11. The composition according to claim 10, wherein the particle size of the colloidal dispersion is of at most 200 nm.

12. A process for the preparation of a composition according to claim 1, comprising the step of mixing the colloidal dispersion with the phosphonate polymer in water and/or a solvent.

13. The composition according to claim 1, wherein (1) is water.

14. The composition according to claim 13, having a pH of between 1 and 10.

15. A process for stabilizing aqueous and/or solvent-based dispersions of mineral particles comprising the step of adding to said dispersions, an efficient stabilising amount of a phosphonate terminated poly(oxyalkene) polymer of the general structure of the formula I:

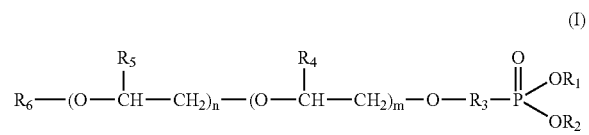

wherein $R_1$ and $R_2$ are independently H, $C_1$-$C_{20}$ alkyl, $C_3$-$C_{20}$ cycloalkyl, or $C_6$-$C_{20}$ aralkyl; $R_3$ is substituted or unsubstituted $C_2$-$C_{20}$ alkyl, $C_4$-$C_{20}$ cycloalkyl, or $C_8$-$C_{20}$ aralkyl; $R_4$ and $R_5$ are independently H or $C_1$-$C_2$ alkyl; $R_6$ is H, $C_1$-$C_{20}$ alkyl, $C_3$-$C_{20}$ cycloalkyl, or $C_6$-$C_{20}$ aralkyl; m and n are independently 0 200; and the moieties to which m and n are subscripted and refer to are either blocked, randomly spaced, or both along the chain between the $OR_3$ and $R_6$ groups.

16. A process according to claim 15, wherein the polymer is of the formula:

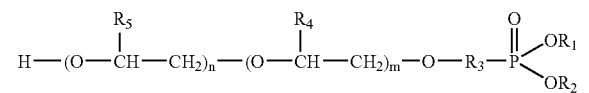

wherein $R_1$ and $R_2$ are independently H, $C_1$-$C_{20}$ alkyl, $C_3$-$C_{20}$ cycloalkyl, or $C_6$-$C_{20}$ aralkyl;

$R_3$ is substituted or unsubstituted $C_2$-$C_{20}$ alkyl, $C_4$-$C_{20}$ cycloalkyl, or $C_8$-$C_{20}$ aralkyl;

$R_4$ and $R_5$ are independently H or $C_1$-$C_2$ alkyl;

m and n are independently 0 200, and the moieties to which m and n are subscripted and refer to are either blocked, randomly spaced, or both along the polyoxyalkene chain.

17. The process according to claim 15, wherein the dispersion is in a polar organic solvent.

18. The process according to claim 17, wherein the solvent is ethylene glycol, propylene glycol, triethylene glycol, glyme, diglyme, propylene glycol monomethyl ether acetate, propylene glycol monomethyl ether 2-(1-methoxy) propyl acetate, propylene glycol monomethylether, ethyl lactate, anisole, methyl adipate, or cyclopentanol.

19. The process according to claim 15, wherein the mineral particles are cationic.

20. The process according to claims 15, wherein the mineral particles are metal oxide particles.

21. The process according to claim 20, wherein the metal is aluminum, zirconium, phosphorus, gallium, germanium, cerium, barium, strontium, yttrium, antimony, cesium, or a combination thereof.

22. The process according to claim 21, wherein the molar ratio between the phosphonate molar equivalent of the polymer (3) and the moles of total metal oxides of the dispersion is of between 0.001 and 10.0.

23. The composition according to claim 22, wherein the molar ratio, is of between 0.1 and 1.5.

24. The process according to claim 15, wherein the particle size of the particle dispersion is of at most 5000 nm.

25. The process according to claim 15, wherein the particle size of the colloidal dispersion is of at most 200 nm.

26. The process according to claim 15, wherein the dispersion is in water and has a pH of between 1 and 10.

27. A paint or varnish composition comprising an aqueous and/or solvent-based dispersion of mineral particles stabilized by the process as defined in any one of claims 15 to 26.

* * * * *